US010733826B2

(12) United States Patent
Scheckelhoff et al.

(10) Patent No.: US 10,733,826 B2
(45) Date of Patent: Aug. 4, 2020

(54) PAYMENT MANAGEMENT SYSTEM OF AN APPLIANCE

(71) Applicant: Haier US Appliance Solutions, Inc., Wilmington, DE (US)

(72) Inventors: Ryan James Scheckelhoff, Louisville, KY (US); Richard Dean Suel, II, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 35 days.

(21) Appl. No.: 16/124,350

(22) Filed: Sep. 7, 2018

(65) Prior Publication Data

US 2020/0082659 A1    Mar. 12, 2020

(51) Int. Cl.
*G07F 7/08* (2006.01)
*G06Q 20/24* (2012.01)

(52) U.S. Cl.
CPC ............... *G07F 7/08* (2013.01); *G06Q 20/24* (2013.01)

(58) Field of Classification Search
CPC .................................................... G06Q 20/24
USPC ............................................................ 705/39
See application file for complete search history.

(56) References Cited

U.S. PATENT DOCUMENTS

| | | | |
|---|---|---|---|
| 6,356,881 B1 | 3/2002 | Milch et al. | |
| 9,256,873 B2 | 2/2016 | Patel et al. | |
| 9,940,617 B2 | 4/2018 | Urquhart | |
| 2008/0027816 A1* | 1/2008 | Han | G06O 20/10 705/17 |
| 2010/0186253 A1 | 7/2010 | Slutsky | |
| 2011/0010279 A1* | 1/2011 | Tuttle | G06Q 10/06 705/30 |
| 2015/0127477 A1* | 5/2015 | Urquhart | G06Q 20/10 705/21 |
| 2015/0170132 A1* | 6/2015 | Patel | G06Q 20/40 705/44 |
| 2017/0082991 A1* | 3/2017 | Belveal | G05B 15/02 |

FOREIGN PATENT DOCUMENTS

EP    1717652 A1 * 11/2006 ............. D06F 95/00

* cited by examiner

*Primary Examiner* — Scott S Trotter
*Assistant Examiner* — Joseph F. Ecker
(74) *Attorney, Agent, or Firm* — Dority & Manning, P.A.

(57) ABSTRACT

A payment management system and a method of operating the same to receive payment before initiating an operating cycle of a cycle-based appliance is provided. The payment management system includes a payment device for receiving a non-cash payment from a user of the appliance. A payment processor communicates the payment to a controller of the appliance in the form of cycle credits, which may be stored in an encrypted credit storage bank. When a user attempts to initiate an operating cycle, the controller compares the available cycle credits to the number of required cycle credits, and only initiates the operating cycle if the number of available credits is equal to or exceeds the number of required credits. The payment management system may be included in any residential appliance and activated by the owner to enable pay-per-use functionality.

18 Claims, 5 Drawing Sheets

PAYMENT MANAGEMENT SYSTEM OF AN APPLIANCE

FIELD OF THE INVENTION

The present subject matter relates generally to appliances, and more particularly to systems and methods for receiving payments before initiating operating cycles of cycle-based appliances.

BACKGROUND OF THE INVENTION

Certain commercial appliances, such as washing machines and clothes dryers at a laundry mat, might have cash-based operating systems that require a user to input cash or coins into the appliance before an operating cycle will begin. Such pay-per-use commercial appliances typically have low-end or very basic operating features. In addition, the owner of the appliance or business typically must deal with large amounts of small cash payments.

By contrast, conventional residential appliances are typically capable of performing standard operating cycles immediately after being removed from packaging and supplied with power. Purchasers of such residential appliance typically make an up front cash or credit payment for such appliances. Notably, given the rise of shared living arrangements, home rental services, and other shared appliance situations, a purchaser of a residential appliance may wish to recoup the costs of their investment. For example, a homeowner who rents their house on a rental website might wish to charge renters for their use of the appliance, a tenant who purchases an appliance may wish to charge their roommates for appliance use, or an appliance owner may wish to generate a revenue steam from owned appliances in other situations as well.

Accordingly, systems and methods enabling a residential appliance owner to charge users of the appliance would be desirable. More specifically, a payment management system that may take non-cash payments to authorize cycle-by-cycle operation of an appliance would be particularly beneficial.

BRIEF DESCRIPTION OF THE INVENTION

Aspects and advantages of the invention will be set forth in part in the following description, or may be obvious from the description, or may be learned through practice of the invention.

In one aspect of the present disclosure, a method of operating an appliance using a payment management system is provided. The method includes determining that the payment management system is enabled and receiving a command to initiate an operating cycle. The method further includes obtaining a number of required credits that are needed to initiate the operating cycle, obtaining a number of available credits from a credit storage bank, and initiating the operating cycle only if the number of available credits is equal to or exceeds the number of required credits.

In another aspect of the present disclosure, a payment management system for authorizing an operating cycle of an appliance is provided. The payment management system includes a payment device for receiving a non-cash payment from a user of the appliance. The payment management system further includes a payment processor providing operative communication between the payment device and a controller of the appliance, wherein the payment processor communicates the payment to the controller in the form of cycle credits, wherein the appliance will initiate the operating cycle only if the payment management system is enabled and a number of available credits is equal to or exceeds the number of required credits.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
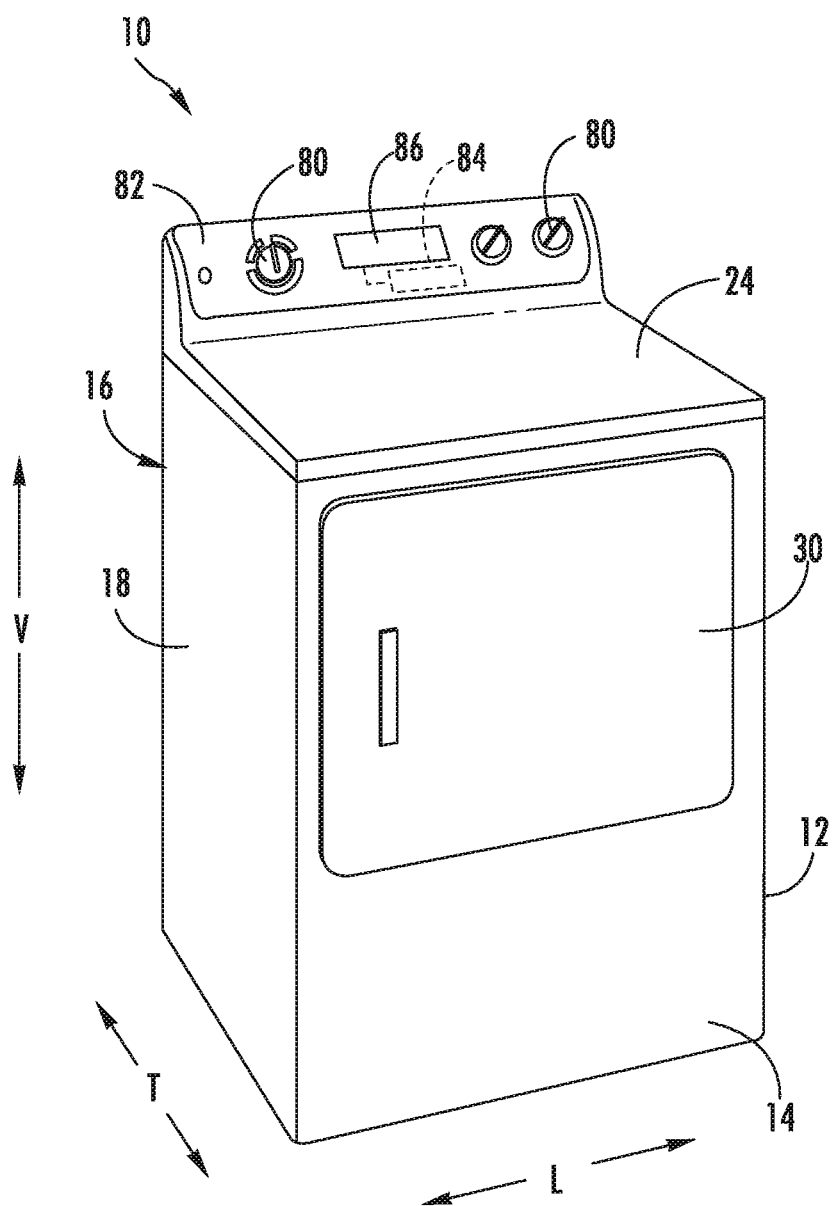
FIG. 1 provides a perspective view of a dryer appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
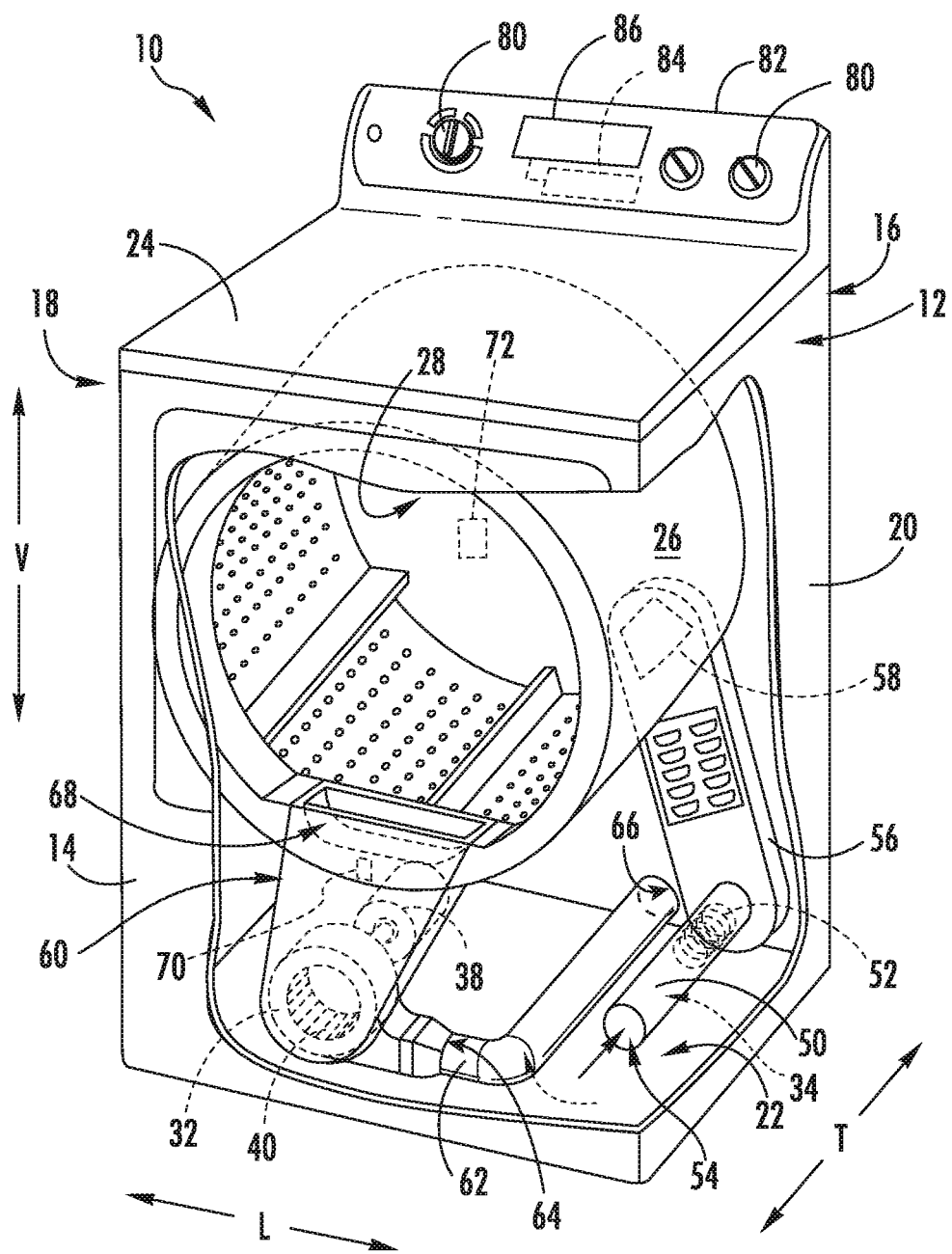
FIG. 2 provides a perspective view of the exemplary dryer appliance of FIG. 1 with portions of a cabinet of the exemplary dryer appliance removed to reveal certain components of the exemplary dryer appliance.

FIG. 1 illustrates a dryer appliance 10 according to an exemplary embodiment of the present subject matter. FIG. 2 provides another perspective view of dryer appliance 10 with a portion of a housing or cabinet 12 of dryer appliance 10 removed in order to show certain components of dryer appliance 10. While described in the context of a specific embodiment of a dryer appliance, using the teachings disclosed herein it will be understood that dryer appliance 10 is provided by way of example only. Other dryer appliances having different appearances and different features may also be utilized with the present subject matter as well.

Dryer appliance 10 defines a vertical direction V, a lateral direction L, and a transverse direction T. The vertical direction V, lateral direction L, and transverse direction T are mutually perpendicular and form an orthogonal direction system. Cabinet 12 includes a front panel 14, a rear panel 16, a pair of side panels 18 and 20 spaced apart from each other by front and rear panels 14 and 16, a bottom panel 22, and a top cover 24. Within cabinet 12 is a container or drum 26 which defines a chamber 28 for receipt of articles, e.g., clothing, linen, etc., for drying. Drum 26 extends between a front portion and a back portion, e.g., along the transverse direction T. In example embodiments, drum 26 is rotatable, e.g., about an axis that is parallel to the transverse direction T, within cabinet 12. A door 30 is rotatably mounted to cabinet 12 for providing selective access to drum 26.

An air handler 32, such as a blower or fan, may be provided to motivate an airflow (not shown) through an entrance air passage 34 and an air exhaust passage 36. Specifically, air handler 32 may include a motor 38 which may be in mechanical communication with a blower fan 40, such that motor 38 rotates blower fan 40. Air handler 32 is configured for drawing air through chamber 28 of drum 26, e.g., in order to dry articles located therein, as discussed in greater detail below. In alternative example embodiments, dryer appliance 10 may include an additional motor (not shown) for rotating fan 40 of air handler 32 independently of drum 26.

Drum 26 may be configured to receive heated air that has been heated by a heating assembly 50, e.g., in order to dry damp articles disposed within chamber 28 of drum 26. Heating assembly 50 includes a heater 52 that is in thermal communication with chamber 28. For instance, heater 52 may include one or more electrical resistance heating elements or gas burners, for heating air being flowed to chamber 28. As discussed above, during operation of dryer appliance 10, motor 38 rotates fan 40 of air handler 32 such that air handler 32 draws air through chamber 28 of drum 26. In particular, ambient air enters air entrance passage 36 defined by heating assembly 50 via an entrance 54 due to air handler 32 urging such ambient air into entrance 54. Such ambient air is heated within heating assembly 50 and exits heating assembly 50 as heated air. Air handler 32 draws such heated air through an air entrance passage 34, including an inlet duct 56, to drum 26. The heated air enters drum 26 through an outlet 58 of duct 56 positioned at a rear wall of drum 26.

Within chamber 28, the heated air can remove moisture, e.g., from damp articles disposed within chamber 28. This internal air flows in turn from chamber 28 through an outlet assembly positioned within cabinet 12. The outlet assembly generally defines an air exhaust passage 36 and includes a trap duct 60, air handler 32, and an exhaust conduit 62. Exhaust conduit 62 is in fluid communication with trap duct 60 via air handler 32. More specifically, exhaust conduit 62 extends between an exhaust inlet 64 and an exhaust outlet 66. According to the illustrated embodiment, exhaust inlet 64 is positioned downstream of and fluidly coupled to air handler 32, and exhaust outlet 66 is defined in rear panel 16 of cabinet 12. During a drying cycle, internal air flows from chamber 28 through trap duct 60 to air handler 32, e.g., as an outlet flow portion of airflow. As shown, air further flows through air handler 32 and to exhaust conduit 62.

The internal air is exhausted from dryer appliance 10 via exhaust conduit 62. In some embodiments, an external duct (not shown) is provided in fluid communication with exhaust conduit 62. For instance, the external duct may be attached (e.g., directly or indirectly attached) to cabinet 12 at rear panel 16. Any suitable connector (e.g., collar, clamp, etc.) may join the external duct to exhaust conduit 62. In residential environments, the external duct may be in fluid communication with an outdoor environment (e.g., outside of a home or building in which dryer appliance 10 is installed). During a drying cycle, internal air may thus flow from exhaust conduit 62 and through the external duct before being exhausted to the outdoor environment.

In exemplary embodiments, trap duct 60 may include a filter portion 68 which includes a screen filter or other suitable device for removing lint and other particulates as internal air is drawn out of chamber 28. The internal air is drawn through filter portion 68 by air handler 32 before being passed through exhaust conduit 62. After the clothing articles have been dried (or a drying cycle is otherwise completed), the clothing articles are removed from drum 26, e.g., by accessing chamber 28 by opening door 30. The filter portion 68 may further be removable such that a user may collect and dispose of collected lint between drying cycles.

In some embodiments, dryer appliance 10 also includes one or more sensors that may be used to facilitate improved operation of dryer appliance 10, such as described below. For example, dryer appliance 10 may include one or more temperature sensors 70 which are generally operable to measure internal temperatures in dryer appliance 10 and/or one or more airflow sensors (not shown) which are generally operable to detect the velocity of air (e.g., as an air flow rate in meters per second, or as a volumetric velocity in cubic meters per second) as it flows through the appliance 10. In some embodiments, an appliance controller (e.g., controller 84 described below) is configured to vary operation of heating assembly 50 based on one or more temperatures detected by the temperature sensors 70 or air flow measurements from the airflow sensors.

Referring still to FIG. 2, dryer appliance 10 includes a humidity sensor 72 which is generally configured for measuring a chamber humidity. Humidity sensor 72 may be positioned at any suitable location within dryer appliance 10. As described herein, "humidity sensor" may refer to any suitable type of humidity sensor, such as capacitive digital sensors, resistive sensors, and thermal conductivity humidity sensors. In addition, humidity sensor 72 may be mounted at any suitable location and in any suitable manner for obtaining a desired humidity measurement, either directly or indirectly. Although exemplary positioning of certain sensors is described below, it should be appreciated that dryer appliance 10 may include any other suitable number, type, and position of temperature and/or humidity sensors according to alternative embodiments.

Referring again to FIGS. 1 and 2, dryer appliance 10 may include one or more selector inputs 80, such as knobs, buttons, touchscreen interfaces, etc., may be provided on a cabinet backsplash 82 and may be in communication with a processing device or controller 84. Signals generated in controller 84 operate motor 38, heating assembly 50, and other system components in response to the position of selector inputs 80. Additionally, a display 86, such as an indicator light or a screen, may be provided on cabinet backsplash 82. Display 86 may be in communication with controller 84, and may display information in response to signals from controller 84.

Figure 3:
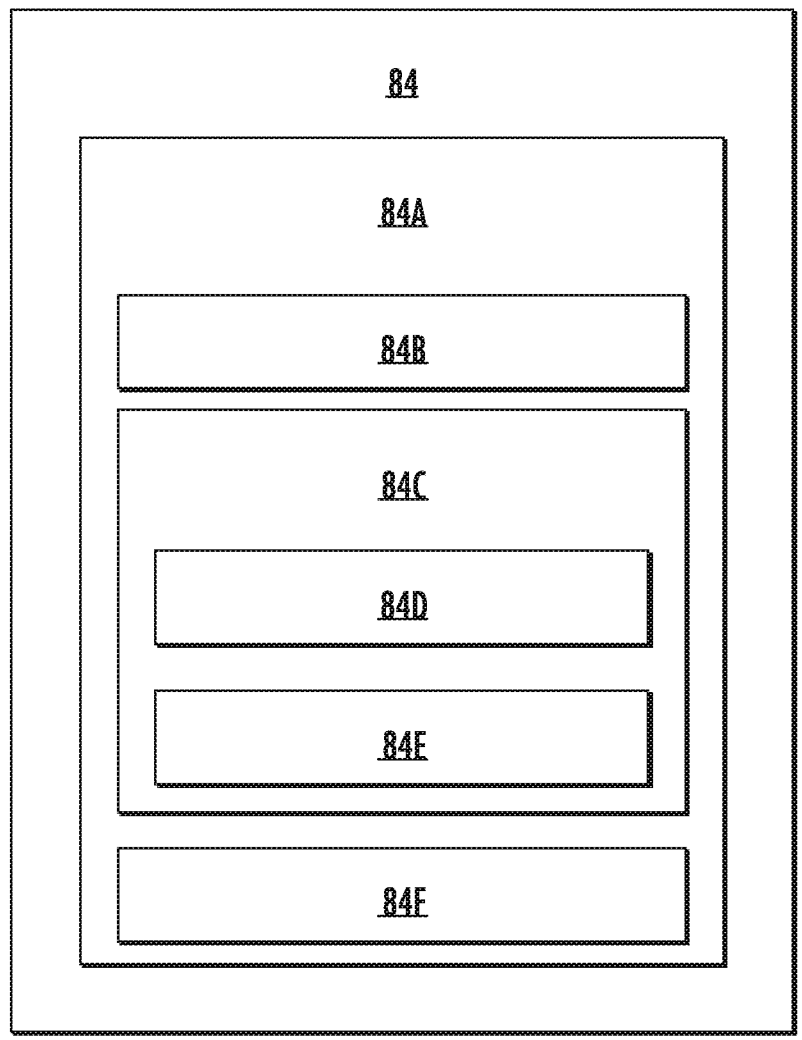
FIG. 3 depicts certain components of a controller according to example embodiments of the present subject matter.

FIG. 3 depicts certain components of controller 84 according to example embodiments of the present disclosure. Controller 84 can include one or more computing device(s) 84A which may be used to implement methods as described herein. Computing device(s) 84A can include one or more processor(s) 84B and one or more memory device(s) 84C. The one or more processor(s) 84B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 84C can include one or more non-transitory computer-readable storage medium(s), such as RAM, ROM, EEPROM, EPROM, flash memory devices, magnetic disks, etc., and/or combinations thereof.

The memory device(s) 84C can include one or more computer-readable media and can store information accessible by the one or more processor(s) 84B, including instructions 84D that can be executed by the one or more processor(s) 84B. For instance, the memory device(s) 84C can store instructions 84D for running one or more software applications, displaying a user interface, receiving user input, processing user input, etc. In some implementations, the instructions 84D can be executed by the one or more processor(s) 84B to cause the one or more processor(s) 84B to perform operations, e.g., such as one or more portions of methods described herein. The instructions 84D can be software written in any suitable programming language or can be implemented in hardware. Additionally, and/or alternatively, the instructions 84D can be executed in logically and/or virtually separate threads on processor(s) 84B.

The one or more memory device(s) 84C can also store data 84E that can be retrieved, manipulated, created, or stored by the one or more processor(s) 84B. The data 84E can include, for instance, data to facilitate performance of methods described herein. The data 84E can be stored in one or more database(s). The one or more database(s) can be connected to controller 84 by a high bandwidth LAN or WAN, or can also be connected to controller through network(s) (such as network 104 described below). The one or more database(s) can be split up so that they are located in multiple locales. In some implementations, the data 84E can be received from another device.

The computing device(s) 84A can also include a communication module or interface 84F used to communicate with one or more other component(s) of controller 84 or dryer appliance 10 over the network(s). The communication interface 84F can include any suitable components for interfacing with one or more network(s), including for example, transmitters, receivers, ports, controllers, antennas, or other suitable components.

As illustrated and described in FIG. 3, controller 84 includes a memory and microprocessor, such as a general or special purpose microprocessor operable to execute programming instructions or micro-control code associated with methods described herein. However, it should be appreciated that according to alternative embodiments, controller 84 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Selector inputs 80, display 86, sensors, and other components of dryer appliance 10 may be in communication with controller 84 via one or more signal lines or shared communication busses.

Figure 4:
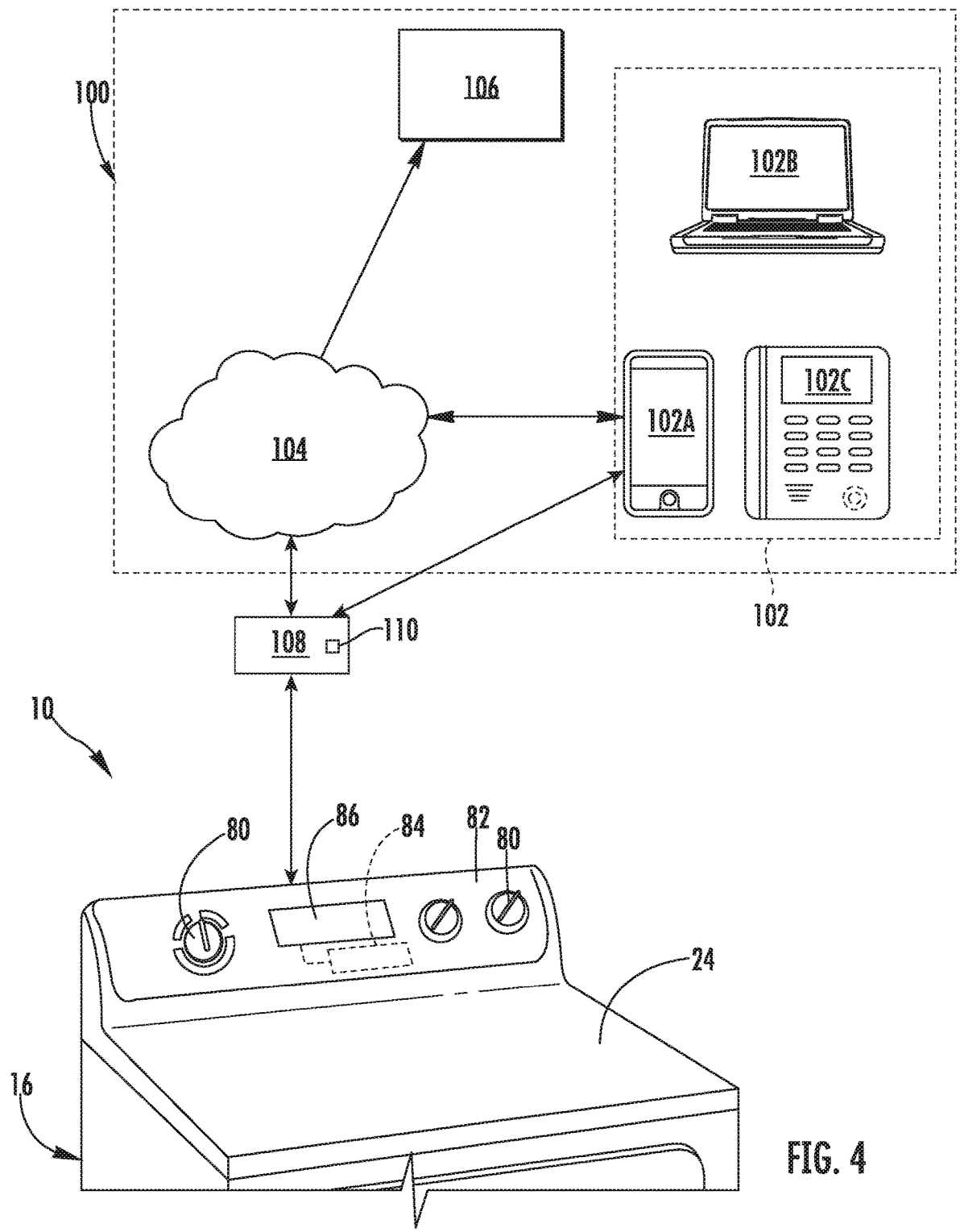
FIG. 4 is a schematic diagram of a payment management system for receiving payments authorizing operating cycles of an appliance such as the exemplary dryer appliance of FIG. 1 according to an exemplary embodiment of the present subject matter.

FIG. 4 provides a schematic diagram of a payment management system 100 for receiving payment for and authorizing operating cycles of an appliance. According to the illustrated embodiment, dryer appliance 10 is used to describe the operation of payment management system 100. However, it should be appreciated that payment management system 100 may be used with any other suitable number and types of appliances. For example, payment management system 100 may be used to authorize operating cycles for any appliance, such as a washing machine, a dishwasher, a cooking appliance, a cooktop, an oven appliance, or any other suitable cycle-based residential appliance. Moreover, aspects of payment management system 100 may be used to receive non-cash payments for authorization of the operation of residential or commercial appliance that are not cycle-based, such as refrigerators or hot water heaters. Other variations and modifications to payment management system 100 are possible and contemplated as within the scope of the present subject matter.

In general, payment management system 100 may include a payment device 102 that is generally configured for receiving non-cash payments from a user of the appliance, e.g., dryer appliance 10. In this regard, "non-cash" payments are intended to refer transfers of digital or virtual currency, as opposed to physical currency, such as banknotes and coins. Thus, payment device 102 may generally be in operative communication with a user's bank account to facilitate or request wire transfers or other payments, or may facilitate the operation of another online or mobile payment system, such as PayPal, Venmo, Square, Apple Pay, Google Pay, etc.

Although exemplary payment devices 102 are described herein, it should be appreciated that payment device 102 may be any suitable device for receiving payment authorization from a user. In this regard, payment device 102 may include, for example, a display, one or more input buttons, a touch screen interface, a magnetic strip or credit card chip reader, etc. As illustrated, payment device 102 may be a personal phone 102A, a tablet, a laptop computer 102B, or another mobile device. Alternatively, payment device 102 may be a credit processing terminal 102C that may include a magnetic credit card reader, a chip reader, a wireless payment module, etc. In addition, according to an exemplary embodiment, credit processing terminal 102C may be directly mounted to dryer appliance 10, or could alternatively be positioned at any other suitable location, such as a central payment terminal within a residence or business.

Payment device 102 may further include a controller (similar to controller 84) for controlling operation of payment device 102 and for communicating with appliance controller 84 and/or remote server 106, as described herein. In this regard, dryer appliance 10, payment device 102, and remote server 106 may all be in operative communication with each other. These devices may be in direct or indirect communication, e.g., directly through a local area network (LAN), Wi-Fi, Bluetooth, etc. or indirectly through a network 104. In this regard, payment management system 100 is configured to allow a user to purchase cycle credits using payment device 102, transfer funds from a user's bank account, send an encrypted signal to dryer appliance 10 to increase the available cycle credits, etc.

In general, network 104 can be any type of communication network. For example, network 104 can include one or more of a wireless network, a wired network, a personal area network, a local area network, a wide area network, the internet, etc. According to an exemplary embodiment, payment device 102 may communicate with a remote server 106 over network 104, such as the internet, to receive or request fund transfers, check the number of available cycle credits, etc. In addition, dryer appliance 10 may either be in direct communication with payment device 102 or indirect communication through network 104, may receive cycle credit authorization from remote server 106 through network 104, etc.

Remote server 106 is remote, and thus external to dryer appliance 10 which is typically located at a single location, e.g., a consumer's residence. Remote server 106 may, for example, be in another room of a house or building in which the dryer appliance 10 is utilized, or in a neighboring building, etc. Alternatively, and in exemplary embodiments, the remote server 106 is a cloud-based server 106, and is thus located at a distant location, such as in a separate state, country, etc. In general, communication between the remote server 106 and the client devices may be carried via a network interface using any type of wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Remote server 106 may generally operate to receive payments and authorize operating cycles, e.g., by sending cycle credits to dryer appliance 10. In this regard, remote server 106 may be in communication with controller 84 of dryer appliance 10, e.g., through network 104. To achieve such communication, for example, remote server 106 may include its own controller similar to that illustrated in FIG. 3. Alternatively, remote server 106 may exist merely to process the payment. Once the payment is accepted, a payment processor 108 (described below) applies the credit to dryer appliance 10. The credit may remain stored in dryer appliance 10, even through a loss of power.

Moreover, payment management system 100 may include a payment processor 108 for transmitting cycle credits and/or enabling or disabling payment management system 100 altogether. More specifically, payment processor 108 may transmit cycle credits and commands to enable or disable payment management system 100 via an encrypted signal, e.g., to reduce or eliminate the likelihood of hacking or unauthorized manipulation of cycle credits.

According to an exemplary embodiment, payment processor 108 is responsible for interfacing between payment device 102 and an appliance credit management system, which may be located for example on controller 84 of dryer appliance 10. Payment processor 108 communicates to payment device 102 using the specific protocol of that device, such as Multi-Drop Bus (MDB) for certain payment devices. Payment device 102 could alternatively be any type of system that accepts payments, such as a cloud-based payment system. Payment processor 108 may include one or more controllers or processors 110 (e.g., similar to controller 84), e.g., to achieve such communications and to facilitate general operation of payment processor 108.

Payment processor 108 also communicates using the appliance communication protocol and performs the following: 1) Enables/Disables the credit processing system in the appliance, 2) Applies credits to the appliance once valid payments have been made using payment device 102, 3) Reads the number of currently available credits. Payment processor 108 may also remove credits from the appliance, although this is normally done by the appliance itself after the user runs a cycle and consumes the credit. The mechanisms to Enable, Disable, Add Credits, Read Available Credits, and Remove Credits are encrypted and using rolling random numbers, etc., to minimize the potential of hacking. Payment processor 108 can adapt any type of payment device or system to the credit processing system embedded in the appliance software, e.g., stored in controller 84.

Payment management system 100 is described below according to an exemplary embodiment of the present subject matter. However, it should be appreciated that the exemplary functions and configurations of payment management system 100 provided herein are used only as examples to facilitate description of aspects of the present subject matter. System configurations may vary, other payment devices may be used to communicate directly or indirectly with one or more appliances, other communication protocols and steps may be implemented, etc. These variations and modifications are contemplated as within the scope of the present subject matter.

Now that the construction and configuration of dryer appliance 10 and payment management system 100 according to an exemplary embodiment of the present subject matter has been presented, an exemplary method 200 for operating an appliance using a payment management system according to an exemplary embodiment of the present subject matter is provided. Method 200 can be used to operate dryer appliance 10 using payment management system, or to operate any other suitable appliance using any other suitable payment management system. In this regard, for example, controller 84 may be configured for implementing method 200. However, it should be appreciated that the exemplary method 200 is discussed herein only to describe exemplary aspects of the present subject matter, and is not intended to be limiting.

Figure 5:
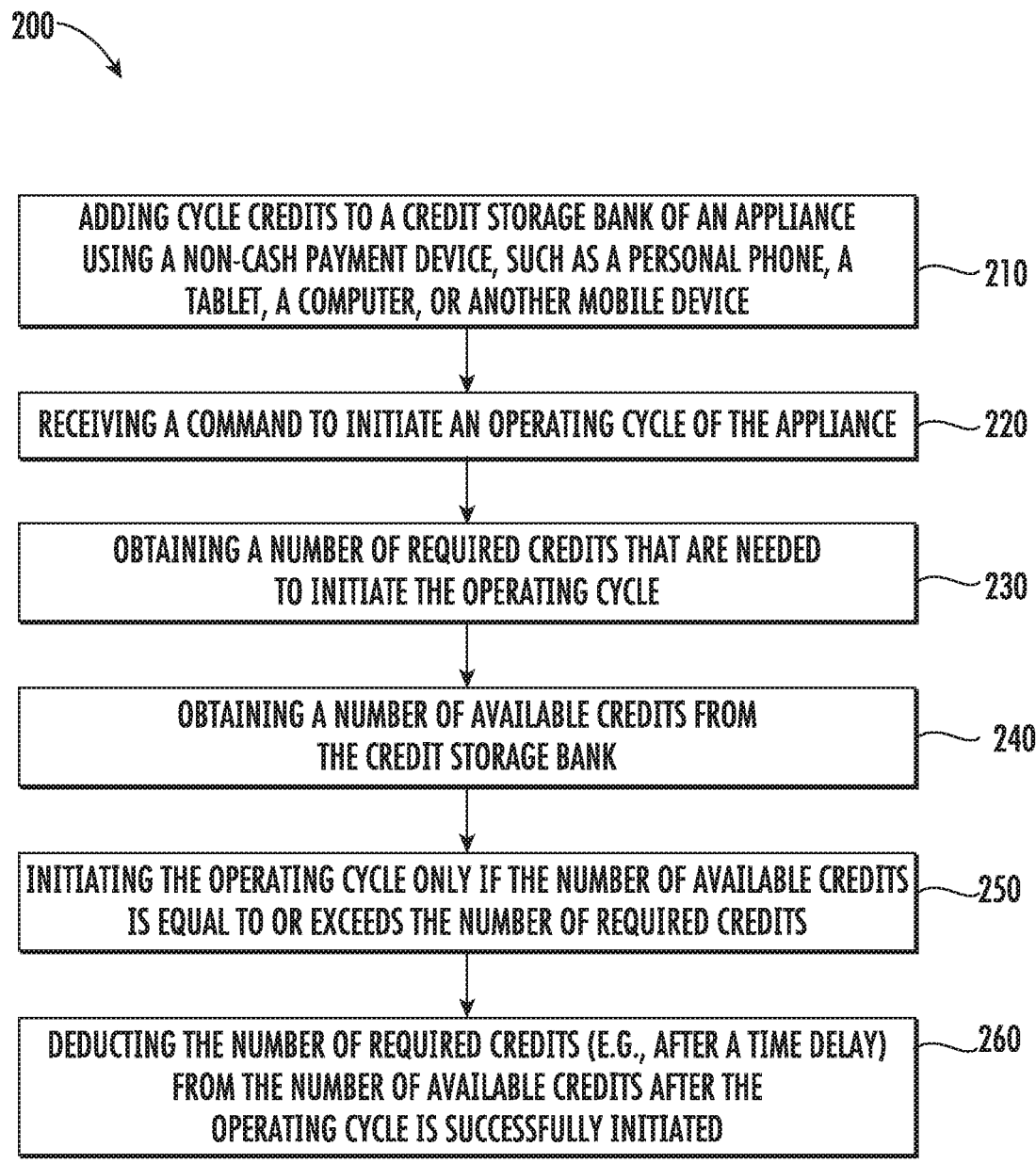
FIG. 5 is a method of operating an appliance using a payment management system in accordance with one embodiment of the present disclosure.

As shown in FIG. 5, method 200 includes, at step 210, adding cycle credits to a credit storage bank of an appliance using a non-cash payment device. In this regard, for example, a user of the cycle-based appliance may use a payment device 102, such as a personal phone, a tablet, a computer, a credit processing terminal, or any other suitable device to authorize a non-cash payment for appliance cycle credits. As used herein, "cycle credits" are intended to refer to or correspond to virtual payments or operating cycle authorizations for a particular appliance. In this regard, for example, a single drying cycle of dryer appliance 10 may cost one cycle credit. However, according to alternative embodiments, different operating cycles may cost a different number of cycle credits. For example, a washing machine appliance may charge one credit for a basic rinse cycle, two credits for a normal wash cycle, three credits for a heavy load wash cycle, etc.

As used herein, an "operating cycle" is intended to refer to any series of steps performed by an appliance for achieving a specific task or operation. For example, if the appliance is a washing machine, the operating cycle may be a wash cycle or a rinse cycle. If the appliance is a dryer, the operating cycle may be a timed drying cycle or a refresh cycle. If the appliance is a cooking appliance, the operating cycle may be burner operation for a predetermined amount of time, a bake cycle, a broil cycle, etc. If the appliance is a dishwasher, the operating cycle may be a normal drying cycle or a sanitation cycle. Moreover, if the appliance is a refrigerator, an operating cycle may constitute a specific operating period, e.g., one week of operation. Other operating cycles for other appliances are contemplated as within the scope of the present subject matter.

In general, the credit storage bank is intended to refer to the virtual repository of cycle credits. The credit storage bank may be, for example, an encrypted segment of non-volatile memory on a controller of the cycle-based appliance, such as controller 84. In this manner, a user of dryer appliance 10 may initiate an operating cycle using locally stored credits even when communication with the internet is down. Alternatively, the credit storage bank may be stored remotely, such as on remote server 106, and may be accessed through network 104 at the commencement of each operating cycle. The addition of cycle credits to the credit storage bank and the deduction or consumption of cycle credits may be initiated using an encrypted command signal to reduce the likelihood of hacking or tampering.

Step 220 may include receiving a command to initiate an operating cycle of the appliance. Continuing the example from above, a user of dryer appliance 10 may manipulate selector inputs 80 in an attempt to initiate a drying cycle. Notably, if payment management system 100 is disabled, the operating cycle may be initiated upon receiving such a command regardless of the number of available credits in the credit storage bank. Thus, method 200 may further include a step of determining that the payment management system is disabled and permitting free operation of dryer appliance 10 in response.

By contrast, if payment management system 100 is enabled, method 200 may further include, at step 230, obtaining a number of required credits that are needed to initiate the operating cycle. In this regard, as explained above, each operating cycle for each appliance may require a single cycle credit or may require a specific number of cycle credits depending on the complexity of the cycle, the water or energy usage associated with the cycle, etc. For example, controller 84 may include a lookup table that specifies the number of cycle credits required for each operating cycle, or may alternatively pull such information from remote server 106.

Step 240 may include obtaining a number of available credits from the credit storage bank. In this regard, the number of cycle credits added at 210 (less the number of credits consumed previously) may be obtained from the credit storage bank. The number of available credits and required credits are then compared to see if there are a sufficient number of available credits to perform the operating cycle. Specifically, step 250 includes initiating the operating cycle only if the number of available credits is equal to or exceeds the number of required credits.

Notably, if the number of available credits is less than the number of required credits, the appliance can provide a notification to the user requesting cycle initiation that additional credits are needed. The user may then have the option of adding additional cycle credits to the credit storage bank in the manner described above.

If step 250 results in the initiation of an operating cycle, step 260 may include deducting the number of required credits from the number of available credits after the operating cycle is successfully initiated. In this regard, if a user has deposited enough cycle credits into the credit storage bank to run a single operating cycle and that single operating cycle is initiated, those credits are consumed, leaving no more cycle credits in the credit storage bank. Notably, it may be desirable to implement a time delay between when a cycle is initiated and when a cycle credit is consumed, e.g. to permit a user the opportunity to change cycles if an incorrect cycle was specified or to otherwise stop an operating cycle before completion. Thus, at step 260, the number of required credits may not be deducted from the number of available credits until a predetermined amount of time has passed since the operating cycle was initiated, e.g. such as one minute or two minutes.

Notably, payment management system 100 as described above provides a means to convert a typical consumer cycle-based appliance to an appliance that requires a separate payment for each operating cycle. Notably, the appliance manufacturer may embed code facilitating the operation of payment management system 100 within residential appliances at the manufacturing stage. Specifically, for example, dormant code, which may be referred to generally as "credit processor software," may be stored on controller 84 of dryer appliance 10 for communicating with payment management system 100 when enabled to facilitate operation.

However, this code may remain dormant until an end-user enables such payment management system when desired. Specifically, for example, an add-on kit may be purchased for use with dryer appliance 10 which is plugged into dryer appliance to enable communication with payment management system 100. Once installed, the purchaser may enable payment management system 100 to charge users of the appliance or may disable payment management system 100 for unrestricted appliance operation. In addition, according to exemplary embodiments, the dormant credit processor software stored on controller 84 must also be enabled. However, as used herein, "enabling" or "disabling" payment management system 100 is intended to refer also to the enabling or disabling of the dormant credit processor software on controller 84. The command to enable or disable payment management system, as well as the payment authorization and cycle addition commands, may all be encrypted to reduce the likelihood of hacking. Alternatively, payment management system 100 may be enabled or disabled using any other suitable method, such as a fingerprint scanner or an NFC tag on a cell phone.

FIG. 5 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using dryer appliance 10 and payment management system 100 as an example, it should be appreciated that these methods may be applied to the operation of any suitable appliance and payment management system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an appliance using a payment management system, the method comprising:
   determining that the payment management system is enabled;
   receiving a command to initiate an operating cycle;
   obtaining a number of required credits that are needed to initiate the operating cycle;
   obtaining a number of available credits from a credit storage bank;
   initiating the operating cycle only if the number of available credits is equal to or exceeds the number of required credits in response to determining that the payment management system is enabled;

determining that the payment management system is disabled; and initiating the operating cycle regardless of the number of available credits in response to determining that the payment management system is disabled.

2. The method of claim 1, wherein the credit storage bank is stored on a controller of the appliance.

3. The method of claim 2, further comprising:
adding cycle credits to the credit storage bank using a non-cash payment device.

4. The method of claim 3, wherein the payment device is a personal phone, a tablet, a computer, or another mobile device.

5. The method of claim 3, wherein the payment device is a credit processing terminal that is mounted to the appliance.

6. The method of claim 3, wherein the payment device is connected to the appliance using a local area network.

7. The method of claim 3, wherein the payment device is a connected to the appliance using Wi-Fi or Bluetooth.

8. The method of claim 3, wherein the payment device is a connected to the appliance through a remote server.

9. The method of claim 2, wherein adding cycle credits to the credit storage bank comprises adding credits using an encrypted signal.

10. The method of claim 1, further comprising:
enabling the payment management system using an encrypted signal.

11. The method of claim 1, further comprising:
deducting the number of required credits from the number of available credits after the operating cycle is successfully initiated.

12. The method of claim 11, wherein the number of required credits are not deducted from the number of available credits until a predetermined amount of time has passed since the operating cycle was initiated.

13. The method of claim 1, wherein the appliance is a washing machine appliance or a dryer appliance.

14. A payment management system for authorizing an operating cycle of an appliance, the payment management system comprising:
a payment device for receiving a non-cash payment from a user of the appliance;
a payment processor providing operative communication between the payment device and a controller of the appliance, wherein the payment processor communicates the payment to the controller in the form of cycle credits, wherein a controller of the appliance is configured for:
determining that the payment management system is enabled;
initiating the operating cycle only if the number of available credits is equal to or exceeds the number of required credits in response to determining that the payment management system is enabled;
determining that the payment management system is disabled; and
initiating the operating cycle regardless of the number of available credits in response to determining that the payment management system is disabled.

15. The payment management system of claim 14, wherein the payment device is a credit processing terminal that is mounted to the appliance.

16. The payment management system of claim 14, wherein the number of required credits is deducted from the number of available credits after the operating cycle is successfully initiated.

17. The payment management system of claim 16, wherein the number of required credits are not deducted from the number of available credits until a predetermined amount of time has passed since the operating cycle was initiated.

18. The payment management system of claim 14, wherein the appliance is a washing machine appliance or a dryer appliance.

* * * * *